United States Patent
Lei

(10) Patent No.: US 12,556,346 B2
(45) Date of Patent: Feb. 17, 2026

(54) METHOD AND APPARATUS FOR FREQUENCY DOMAIN RESOURCE ALLOCATION FOR DOWNLINK TRANSMISSIONS

(71) Applicant: LENOVO (BEIJING) LIMITED, Beijing (CN)

(72) Inventor: Haipeng Lei, Beijing (CN)

(73) Assignee: LENOVO (BEIJING) LIMITED, Beijing (CN)

( * ) Notice: Subject to any disclaimer, the term of this patent is extended or adjusted under 35 U.S.C. 154(b) by 480 days.

(21) Appl. No.: 18/249,690

(22) PCT Filed: Oct. 23, 2020

(86) PCT No.: PCT/CN2020/123180
§ 371 (c)(1),
(2) Date: Apr. 19, 2023

(87) PCT Pub. No.: WO2022/082715
PCT Pub. Date: Apr. 28, 2022

(65) Prior Publication Data
US 2023/0388092 A1    Nov. 30, 2023

(51) Int. Cl.
*H04L 5/00* (2006.01)
*H04W 72/232* (2023.01)

(52) U.S. Cl.
CPC ............ *H04L 5/0094* (2013.01); *H04L 5/001* (2013.01); *H04L 5/0053* (2013.01); *H04W 72/232* (2023.01)

(58) Field of Classification Search
CPC ..... H04L 5/0094; H04L 5/001; H04L 5/0053; H04W 72/232
See application file for complete search history.

(56) References Cited

U.S. PATENT DOCUMENTS

| | | | |
|---|---|---|---|
| 11,096,211 B2 * | 8/2021 | Jung | H04W 72/04 |
| 2019/0313377 A1 * | 10/2019 | Abdoli | H04L 1/0071 |
| 2020/0022168 A1 | 1/2020 | Xu et al. | |

FOREIGN PATENT DOCUMENTS

| | | |
|---|---|---|
| CN | 109152023 A | 1/2019 |
| CN | 110168972 A | 8/2019 |

(Continued)

OTHER PUBLICATIONS

International Search Report and Written Opinion date Jul. 14, 2021 for International Application No. PCT/CN2020/123180.

(Continued)

*Primary Examiner* — Duc C Ho
(74) *Attorney, Agent, or Firm* — AMPACC Law Group, PLLC

(57) ABSTRACT

Embodiments of the present disclosure relate to frequency domain resource allocation for downlink transmissions. According to some embodiments of the disclosure, a method for wireless communication performed by a user equipment (UE) may include: receiving a physical downlink control channel (PDCCH) within a control resource set (CORESET), wherein the PDCCH carries a downlink control information (DCI) format for scheduling a physical downlink shared channel (PDSCH); and receiving the PDSCH on a plurality of resource blocks (RBs) based on the DCI format, wherein the plurality of RBs are within a frequency region.

20 Claims, 8 Drawing Sheets

(56) References Cited

FOREIGN PATENT DOCUMENTS

| | | |
|---|---|---|
| CN | 110786045 A | 2/2020 |
| WO | 2018175420 A1 | 9/2018 |
| WO | 2022081996 A1 | 4/2022 |

OTHER PUBLICATIONS

Nokia et al. "On the PDCCH construction for NR" 3GPP TSG RAN WG1 NR Ad-Hoc#2 R1-1710980; Jun. 30, 2017; pp. 1-5.
Moderator "FL summary on NR Multicast and Broadcast Services" 3GPP TSG RAN WG1 #102-e, R1-2007001; Aug. 28, 2020; 2 pages.
CMCC "Discussion on group scheduling mechanisms in NR MBS" 3GPP TSG RAN WG1 #102-e, R1-2006233; Aug. 28, 2020; 9 pages.
European Search Report dated Jul. 15, 2024 for European Patent Application No. 20958297.2.

\* cited by examiner

METHOD AND APPARATUS FOR FREQUENCY DOMAIN RESOURCE ALLOCATION FOR DOWNLINK TRANSMISSIONS

CROSS REFERENCE TO RELATED APPLICATIONS

This application is a national phase entry of International Application No. PCT/CN2020/123180 filed Oct. 23, 2020, which is incorporated by reference in its entirety.

TECHNICAL FIELD

Embodiments of the present disclosure generally relate to wireless communication technology, and more particularly to frequency domain resource allocation for downlink (DL) transmissions.

BACKGROUND

Wireless communication systems are widely deployed to provide various telecommunication services such as telephony, video, data, messaging, broadcasts, and so on. Wireless communication systems may employ multiple access technologies capable of supporting communication with multiple users by sharing available system resources (e.g., time, frequency, and power). Examples of wireless communication systems may include fourth generation (4G) systems such as long term evolution (LTE) systems, LTE-advanced (LTE-A) systems, or LTE-A Pro systems, and fifth generation (5G) systems which may also be referred to as new radio (NR) systems.

In a wireless communication system, a user equipment (UE) may monitor a physical downlink control channel (PDCCH), which may carry downlink control information (DCI). The DCI may schedule uplink channels, such as a physical uplink shared channel (PUSCH), or downlink channels, such as a physical downlink shared channel (PDSCH). In the case that a DCI schedules a PDSCH, the UE may transmit hybrid automatic repeat request acknowledgement (HARQ-ACK) feedback (e.g., included in a HARQ-ACK codebook) corresponding to the PDSCH through a PUSCH or a physical uplink control channel (PUCCH).

There is a need for handling frequency domain resource allocation for DL transmissions such as PDSCH in a wireless communication system.

SUMMARY

Some embodiments of the present disclosure provide a method for wireless communication performed by a user equipment (UE). The method may include: receiving a physical downlink control channel (PDCCH) within a control resource set (CORESET), wherein the PDCCH carries a downlink control information (DCI) format for scheduling a physical downlink shared channel (PDSCH); and receiving the PDSCH on a plurality of resource blocks (RBs) based on the DCI format, wherein the plurality of RBs are within a frequency region.

In some embodiments of the present disclosure, the method may further include receiving a radio resource control (RRC) signaling message configuring the frequency region. The frequency region may be shared between the UE and another UE. In some examples, the RRC signaling message may indicate a starting RB and a number of contiguous RBs of the frequency region. In some examples, the RRC signaling message may indicate a starting RB and an ending RB of the frequency region. The CORESET may be within the frequency region. The plurality of RBs may be determined in reference to the starting RB of the frequency region. A payload size of the DCI format may be based on a total number of RBs contained within the frequency region.

In some embodiments of the present disclosure, the method may further include receiving a radio resource control (RRC) signaling message configuring the CORESET. The CORESET may be shared between the UE and another UE. The frequency region may be based on the CORESET.

In some examples, the CORESET may be within an active bandwidth part (BWP) of the UE and an active BWP of the another UE. The plurality of RBs may be determined in reference to the lowest RB of the CORESET. A payload size of the DCI format may be based on a total number of contiguous RBs from the lowest RB of the CORESET to the highest RB of the CORESET. In some other examples, the CORESET may be within an initial downlink bandwidth part (BWP) of the UE and an initial downlink BWP of the another UE. The plurality of RBs may be determined in reference to the RB corresponding to the lowest resource element group (REG) of the PDCCH. A payload size of the DCI format may be based on the initial downlink BWP of the UE.

In some embodiments of the present disclosure, the CORESET and the frequency region may be within an initial downlink bandwidth part (BWP) of the UE and an initial downlink BWP of another UE. The plurality of RBs may be determined in reference to the lowest RB of the initial downlink BWP of the UE. A payload size of the DCI format may be based on the initial downlink BWP of the UE.

Some embodiments of the present disclosure provide a method for wireless communication performed by a base station (BS). The method may include: transmitting, to at least one user equipment (UE), a physical downlink control channel (PDCCH) within a control resource set (CORESET), wherein the PDCCH carries a downlink control information (DCI) format for scheduling a physical downlink shared channel (PDSCH); and transmitting, to the at least one UE, the PDSCH on a plurality of resource blocks (RBs) based on the DCI format, wherein the plurality of RBs are within a frequency region.

In some embodiments of the present disclosure, the method may further include transmitting a radio resource control (RRC) signaling message configuring the frequency region. The frequency region may be shared between the at least one UE. In some examples, the RRC signaling message may indicate a starting RB and a number of contiguous RBs of the frequency region. In some examples, the RRC signaling message may indicate a starting RB and an ending RB of the frequency region. The CORESET may be within the frequency region. The plurality of RBs may be determined in reference to the starting RB of the frequency region. A payload size of the DCI format may be based on a total number of RBs contained within the frequency region.

In some embodiments of the present disclosure, the method may further include transmitting a radio resource control (RRC) signaling message configuring the CORESET. The CORESET may be shared between the at least one UE. The frequency region may be based on the CORESET.

In some examples, the CORESET may be within an active bandwidth part (BWP) of the at least one UE. The plurality of RBs may be in reference to the lowest RB of the CORESET. A payload size of the DCI format may be based on a total number of contiguous RBs from the lowest RB of the CORESET to the highest RB of the CORESET. In some other examples, the CORESET may be within an initial downlink bandwidth part (BWP) of the at least one UE. The plurality of RBs may be determined in reference to the RB corresponding to the lowest resource element group (REG) of the PDCCH. A payload size of the DCI format may be based on the initial downlink BWP of the at least one UE.

In some embodiments of the present disclosure, the CORESET and the frequency region may be within an initial downlink bandwidth part (BWP) of the at least one UE. The plurality of RBs may be determined in reference to the lowest RB of the initial downlink BWP of the at least one UE. A payload size of the DCI format may be based on the initial downlink BWP of the at least one UE.

Some embodiments of the present disclosure provide an apparatus. According to some embodiments of the present disclosure, the apparatus may include: at least one non-transitory computer-readable medium having stored thereon computer-executable instructions; at least one receiving circuitry; at least one transmitting circuitry; and at least one processor coupled to the at least one non-transitory computer-readable medium, the at least one receiving circuitry and the at least one transmitting circuitry, wherein the at least one non-transitory computer-readable medium and the computer executable instructions may be configured to, with the at least one processor, cause the apparatus to perform a method according to some embodiments of the present disclosure.

BRIEF DESCRIPTION OF THE DRAWINGS

In order to describe the manner in which the advantages and features of the disclosure can be obtained, a description of the disclosure is rendered by reference to specific embodiments thereof, which are illustrated in the appended drawings. These drawings depict only exemplary embodiments of the disclosure and are not therefore to be considered limiting of its scope.

DETAILED DESCRIPTION

The detailed description of the appended drawings is intended as a description of the preferred embodiments of the present disclosure and is not intended to represent the only form in which the present disclosure may be practiced. It should be understood that the same or equivalent functions may be accomplished by different embodiments that are intended to be encompassed within the spirit and scope of the present disclosure.

Reference will now be made in detail to some embodiments of the present disclosure, examples of which are illustrated in the accompanying drawings. To facilitate understanding, embodiments are provided under specific network architecture and new service scenarios, such as the 3rd generation partnership project (3GPP) 5G (NR), 3GPP long-term evolution (LTE) Release 8, and so on. It is contemplated that along with the developments of network architectures and new service scenarios, all embodiments in the present disclosure are also applicable to similar technical problems; and moreover, the terminologies recited in the present disclosure may change, which should not affect the principles of the present disclosure.

Figure 1:
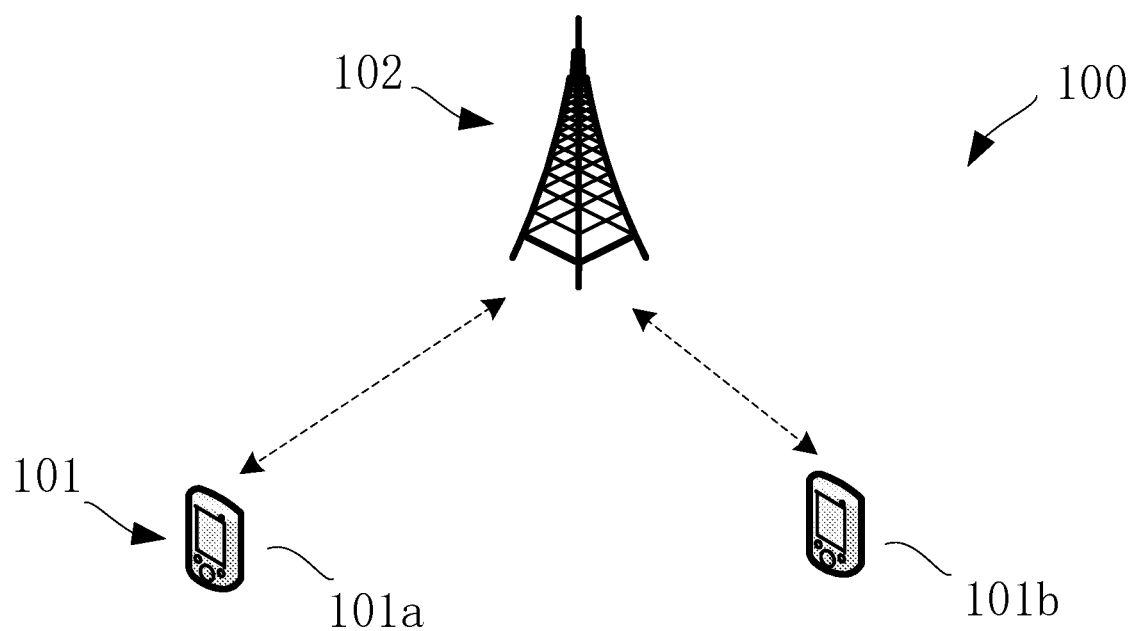
FIG. 1 illustrates a schematic diagram of a wireless communication system in accordance with some embodiments of the present disclosure.

FIG. 1 illustrates a schematic diagram of a wireless communication system 100 in accordance with some embodiments of the present disclosure.

As shown in FIG. 1, a wireless communication system 100 may include some UEs 101 (e.g., UE 101a and UE 101b) and a base station (e.g., BS 102). Although a specific number of UEs 101 and BS 102 are depicted in FIG. 1, it is contemplated that any number of UEs and BSs may be included in the wireless communication system 100.

The UE(s) 101 may include computing devices, such as desktop computers, laptop computers, personal digital assistants (PDAs), tablet computers, smart televisions (e.g., televisions connected to the Internet), set-top boxes, game consoles, security systems (including security cameras), vehicle on-board computers, network devices (e.g., routers, switches, and modems), or the like. According to some embodiments of the present disclosure, the UE(s) 101 may include a portable wireless communication device, a smart phone, a cellular telephone, a flip phone, a device having a subscriber identity module, a personal computer, a selective call receiver, or any other device that is capable of sending and receiving communication signals on a wireless network. In some embodiments of the present disclosure, the UE(s) 101 includes wearable devices, such as smart watches, fitness bands, optical head-mounted displays, or the like. Moreover, the UE(s) 101 may be referred to as a subscriber unit, a mobile, a mobile station, a user, a terminal, a mobile terminal, a wireless terminal, a fixed terminal, a subscriber station, a user terminal, or a device, or described using other terminology used in the art. The UE(s) 101 may communicate with the BS 102 via uplink (UL) communication signals.

The BS 102 may be distributed over a geographic region. In certain embodiments of the present disclosure, the BS 102 may also be referred to as an access point, an access terminal, a base, a base unit, a macro cell, a Node-B, an evolved Node B (eNB), a gNB, a Home Node-B, a relay node, or a device, or described using other terminology used in the art. The BS 102 is generally a part of a radio access network that may include one or more controllers communicably coupled to one or more corresponding BSs 102. The BS 102 may communicate with UE(s) 101 via downlink (DL) communication signals.

The wireless communication system 100 may be compatible with any type of network that is capable of sending and receiving wireless communication signals. For example, the wireless communication system 100 is compatible with a wireless communication network, a cellular telephone network, a time division multiple access (TDMA)-based network, a code division multiple access (CDMA)-based network, an orthogonal frequency division multiple access (OFDMA)-based network, an LTE network, a 3GPP-based network, a 3GPP 5G network, a satellite communications network, a high altitude platform network, and/or other communications networks.

In some embodiments of the present disclosure, the wireless communication system 100 is compatible with the 5G NR of the 3GPP protocol. For example, BS 102 may transmit data using an orthogonal frequency division multiple (OFDM) modulation scheme on the DL and the UE(s) 101 may transmit data on the UL using a discrete Fourier transform-spread-orthogonal frequency division multiplexing (DFT-S-OFDM) or cyclic prefix-OFDM (CP-OFDM) scheme. More generally, however, the wireless communication system 100 may implement some other open or proprietary communication protocols, for example, WiMAX, among other protocols.

In some embodiments of the present disclosure, the BS 102 and UE(s) 101 may communicate using other communication protocols, such as the IEEE 802.11 family of wireless communication protocols. Further, in some embodiments of the present disclosure, the BS 102 and UE(s) 101 may communicate over licensed spectrums, whereas in some other embodiments, the BS 102 and UE(s) 101 may communicate over unlicensed spectrums. The present disclosure is not intended to be limited to the implementation of any particular wireless communication system architecture or protocol.

3GPP release 17 (R17) work item description (WID) includes a set of objectives for multicast and broadcast services (MBSs), including, for example:
  Specify RAN basic functions for broadcast/multicast for UEs in RRC_CONNECTED state:
    Specify required changes to improve reliability of Broadcast/Multicast service, e.g., by UL feedback. The level of reliability should be based on the requirements of the application/service provided.
  Specify RAN basic functions for broadcast/multicast for UEs in RRC_IDLE/RRC INACTIVE states:
    Specify required changes to enable the reception of Point to Multipoint transmissions by UEs in RRC_IDLE/RRC_INACTIVE states, with the aim of keeping maximum commonality between RRC_CONNECTED state and RRC_IDLE/RRC_INACTIVE state for the configuration of PTM (point to multipoint) reception According to the above objectives, HARQ-ACK feedback from UEs corresponding to downlink multicast transmission is essential for the multicast services in order to satisfy the quality of service (QoS) requirements, e.g., reliability.

Furthermore, the above objectives also state that the level of reliability should be based on the requirements of the application/service which is provided by a MBS. The group cell radio network temporary identifier (G-RNTI) is introduced for MB S so that a UE can differentiate a DCI scheduling a MBS PDSCH from a DCI scheduling a unicast PDSCH. Specially, the cyclic redundancy check (CRC) of the DCI scheduling the MBS PDSCH as well as the scheduled MBS PDSCH is scrambled by a G-RNTI.

In the 3GPP RAN1 #102-e meeting, the following agreement was made for PDSCH scheduling:
  For RRC_CONNECTED UEs, define/configure a common frequency resource for group-common PDSCH.

Clearly, one important issue is how to define or configure a common frequency resource for a group of UEs to receive the MBS PDSCH. In some embodiments of the present disclosure, the following two options may be employed to define the common frequency resource:

Option 1: An MBS specific bandwidth part (BWP) may be configured by the BS as a group-common BWP. For example, the same frequency domain resource and subcarrier spacing as well as cyclic prefix are configured for a group of UEs. For a specific member UE, if the BWP configured for unicast transmission (hereinafter, "the unicast BWP") does not overlap with the MBS specific BWP, the UE has to perform BWP switching back and forth between the MBS specific BWP and the unicast BWP because only a single active BWP is allowed at a given time in NR systems. Otherwise, in the case that two (or more) active BWPs at a given time are supported, BWP switching may not be required.

Option 2: A common frequency resource which is the intersection of the frequency resources supported by a group of UEs may be defined or configured. That is to say, within each member UE's active BWP, a common MBS frequency resource can be defined for each member UE to receive the group-common DCI and the associated group-common PDSCH.

In some embodiments of the present disclosure, it would be beneficial to employ Option 2 since it does not require BWP switching between the MBS specific BWP and the unicast BWP, which may be somewhat frequent.

On the other hand, since different UEs may have different active BWPs, for example, a different central frequency point or bandwidth, there is no common reference for the group of UEs to determine the allocated frequency resource. Therefore, one issue is how to indicate to the group of UEs the scheduled frequency resource for transmitting the group-common PDSCH. For example, either resource allocation type 0 or type 1 may be used for allocating the frequency resource within a target UE's active BWP. Such common reference is needed for either of the two resource allocation types. However, due to the possible different active BWPs among the group of UEs, it would be difficult to find out a common reference to define the starting physical resource block (PRB) of the common frequency resource.

Another issue is how to determine the payload size (e.g., the size of the frequency domain resource assignment (FDRA) indicator) in a DCI format from a UE's perspective. Generally, the number of bits required for a FDRA indicator is based on the bandwidth of the UE's BWP. Since different UEs may have different BWP bandwidths, a solution for determining the same payload size of a DCI format scheduling the group-common PDSCH is required.

Embodiments of present disclosure provide solutions to facilitate DL transmissions, especially, MBS PDSCH transmissions. The disclosed solutions can solve the above problems. More details on the embodiments of the present disclosure will be illustrated in the following text in combination with the appended drawings.

In some embodiments of the present disclosure, for a group of UEs, a common frequency region may be configured by RRC signaling (e.g., master information block (MIB), system information block (SIB) signaling or UE-specific RRC signaling). Each member UE of the group of UEs may be in an RRC_CONNECTED state. The common frequency region is within the active BWP of each member UE of the group of UEs. The PDCCH carrying a group-common DCI format (e.g., DCI format 1_0) and the scheduled PDSCH (also referred to as "group-common PDSCH") are transmitted within the common frequency region. For example, the UE may receive the PDCCH carrying a group-common DCI format within a control resource set (CORESET), which may be configured by RRC signaling. The CORESET may be within the common frequency region. The scheduled PDSCH may be carried on a plurality of RBs within the common frequency region.

In some examples, to configure the common frequency region, the RRC signaling may indicate the starting RB (hereinafter, "$RB_{start}$") and the number of contiguous RBs (hereinafter, "L") in the frequency domain. The group-common DCI may include a FDRA indicator indicating resource block assignment information. The number of bits of the FDRA indicator in the group-common DCI may be based on the number of contiguous RBs of the common frequency region. For the group-common PDSCH scheduled by the group-common DCI, the RB numbering may start from the configured starting RB. That is, $RB_{start}$ is used as the reference point (e.g., indexed as RB 0) for resource allocation indication in the frequency domain, i.e., $RB_{start}$ is used as the lowest RB for determining the frequency resource allocation of the group-common PDSCH.

In some other examples, to configure the common frequency region, the RRC signaling may indicate the starting RB (i.e., $RB_{start}$) and the ending RB (hereinafter, "$RB_{end}$") in the frequency domain. All the RBs between the starting RB and the ending RB are assumed as the common frequency region from a UE's perspective. Similarly, the number of bits of the FDRA indicator in the group-common DCI may be based on the number of contiguous RBs (i.e., L) between $RB_{start}$ and $RB_{end}$. $RB_{start}$ is used as the reference point (e.g., indexed as RB 0) for resource allocation indication in the frequency domain, i.e., $RB_{start}$ is used as the lowest RB for determining the frequency resource allocation of the group-common PDSCH.

For example, the number of bits of the FDRA indicator in the group-common DCI can be determined according to $\lceil \log_2(N_{RB}^{DL,BWP}(N_{RB}^{DL,BWP}+1)/2) \rceil$, where $N_{RB}^{DL,BWP}$ is set to L.

In some embodiments, resource allocation type 0 is applied for downlink transmissions. In these embodiments, the resource block assignment information indicated by the FDRA indicator may include a bitmap indicating the resource block groups (RBGs) that are allocated to the scheduled UEs.

An RBG may be a set of consecutive RBs (e.g., virtual resource blocks (VRBs)) defined based on, for example, the following Table 1, where the bandwidth part size is set to L. It should be understood that Table 1 is only for illustrative purposes, and should not be construed as limiting the embodiments of the present disclosure.

TABLE 1

| Bandwidth Part Size | Nominal RBG size P | |
|---|---|---|
| | Configuration 1 | Configuration 2 |
| 1-36 | 2 | 4 |
| 37-72 | 4 | 8 |
| 73-144 | 8 | 16 |
| 145-275 | 16 | 16 |

According to the above Table 1, when the number of contiguous RBs (L) in the frequency domain is 20 (i.e., between "1-36"), the number of VRBs in a RBG is 2 in the case of configuration 1 and is 4 in the case of configuration 2. An RRC signaling may indicate whether configuration 1 or configuration 2 is employed.

The number of bits of the bitmap is equal to the total number of RBGs ($N_{RBG}$) for the common frequency region, which can be determined by $N_{RBG}=\lceil L/P \rceil$.

In some embodiments, resource allocation type 1 is applied for downlink transmissions. In these embodiments, the resource block assignment information may indicate a resource indication value (MV) corresponding to a starting RB and a length in terms of contiguously allocated resource blocks. The starting RB of the scheduled PDSCH (e.g., MBS PDSCH) is in reference to the starting RB ($RB_{start}$) of the common frequency region, and the length may not exceed L. In other words, $RB_{start}$ may be indexed as RB 0 for determining PDSCH resource block assignment.

In some embodiments, the same subcarrier spacing and cyclic prefix of the common frequency region are also configured to the group of UEs.

Figure 2:
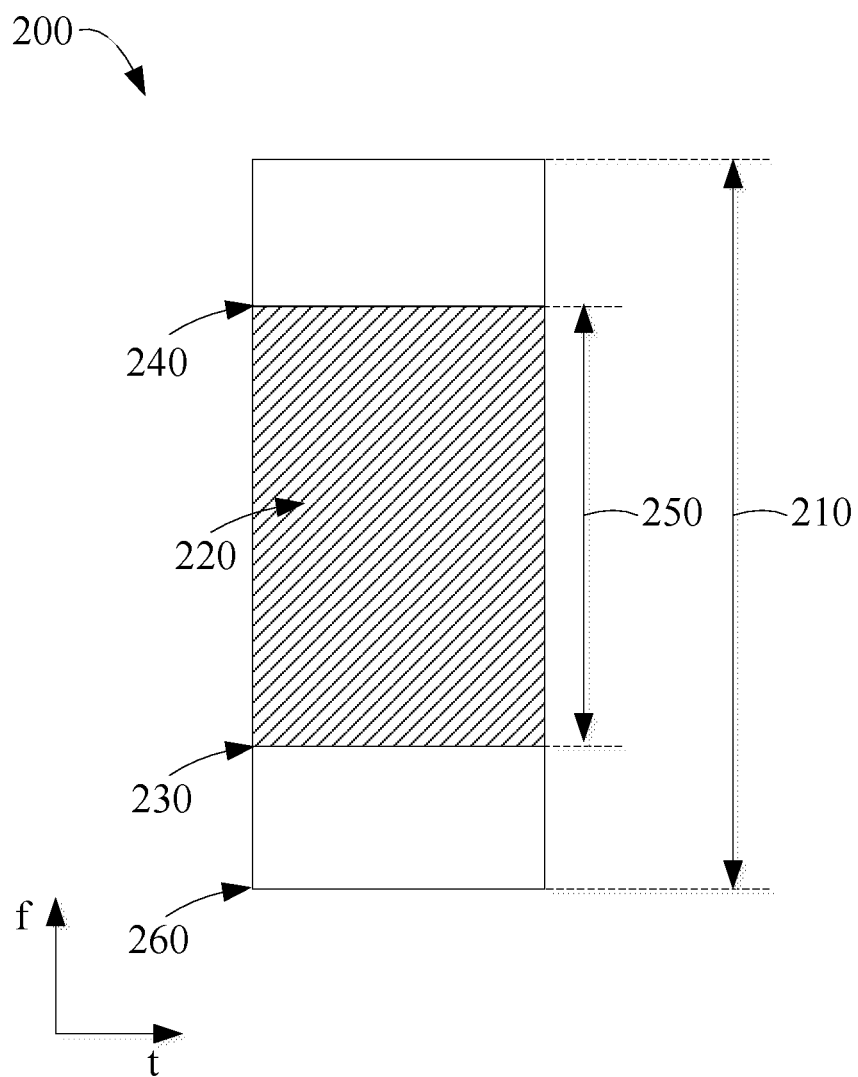
FIG. 2 illustrates exemplary radio resource allocation in accordance with some embodiments of the present disclosure.

FIG. 2 illustrates exemplary radio resource allocation 200 in accordance with some embodiments of the present disclosure. Details described in all of the foregoing embodiments of the present disclosure are applicable for the embodiments shown in FIG. 2. It should be understood that FIG. 2 is only for illustrative purposes, and should not be construed as limiting the embodiments of the present disclosure.

Referring to FIG. 2, a UE (UE #1) may support an active BWP 210 (e.g., an active DL BWP). The UE may be a member UE of a group of UEs. Other UEs in the group of UEs support the same or different active BWPs (not shown in FIG. 2).

A BS may configure a common frequency region 220 to the group of UEs via an RRC signaling message. The common frequency region 220 may be within active BWP 210 of UE #1, as well as active BWPs of other UEs of the group of UEs.

In some examples, the RRC signaling message may indicate the starting RB 230 of the frequency region and the number of contiguous RBs 250 in the frequency domain. In some examples, the RRC signaling message may indicate the starting RB 230 and the ending RB 240 of the frequency region. In either case, a member UE (e.g., UE #1) may determine the common frequency region 220 within its active BWP (e.g., active BWP 210). The numbering of the starting RB 230 and the ending RB 240 may be in reference to the lowest RB 260 (lowest in the frequency domain) of the active BWP 210.

The BS may transmit a DCI format (e.g., a group-common DCI format) and the scheduled PDSCH to the group of UEs in the frequency region 220. For example, the BS may configure a CORESET in the frequency region 220 to the group of UEs by RRC signaling (e.g., in the form of a RBG-based bitmap), and may transmit a PDCCH carrying a DCI format in the CORESET. The DCI format may include a FDRA indicator indicating the resource block assignment information for the scheduled PDSCH (e.g., a plurality of RBs for carrying the scheduled PDSCH). The number of bits of the FDRA indicator may be determined based on the number of contiguous RBs 250 (e.g., L), as described above. The resource block assignment information may be determined in reference to the starting RB 230 of the frequency region 220. For example, the starting RB 230 may be indexed as RB 0, and in the case that the resource block assignment information indicates that RB n is for the scheduled PDSCH, the UE would know that the scheduled PDSCH is transmitted at a frequency resource n RBs higher than the starting RB 230 in the frequency domain.

In the case that resource allocation type 0 is applied, the resource block assignment information may include a bitmap indicating the RBGs that are allocated to the scheduled UEs. The number of bits of the bitmap can be determined based on the number of contiguous RBs 250 (e.g., L), as described above.

In the case that resource allocation type 1 is applied, the resource block assignment information may indicate an RIV corresponding to a starting RB (in reference to the starting RB 230) and a length in terms of contiguously allocated resource blocks. The length does not exceed the number of contiguous RBs 250.

In this way, the member UEs (including UE #1) can receive the scheduled PDSCH on a plurality of RBs within the frequency region 220 based on the DCI format.

In some embodiments of the present disclosure, a common CORESET may be configured by RRC signaling (e.g., MIB, SIB signaling or UE-specific RRC signaling) for a group of UEs to monitor the group-common DCI scheduling a PDSCH (e.g., MBS PDSCH).

Each UE of the group of UEs may be in an RRC_CONNECTED state. The common CORESET may be within the active BWP of each member UE of the group of UEs. The common CORESET may be indicated by a RBG-based bitmap, where, for example, each RBG includes 6 contiguous RBs with reference to Point A (i.e., the lowest subcarrier on the carrier, subcarrier 0 of common resource block (CRB) 0). The PDCCH carrying a group-common DCI may be transmitted in the CORESET. The scheduled PDSCH may be carried on a plurality of RBs within a frequency region ranging from the lowest RB (hereinafter, "$RB_x$") of the CORESET to the highest RB (hereinafter, "$RB_y$") of the CORESET.

The number of bits of a FDRA indicator in the group-common DCI may be determined based on the number of contiguous RBs within the frequency region ranging from the lowest RB of the CORESET to the highest RB of the CORESET. For the group-common PDSCH scheduled by the group-common DCI, the RB numbering may start from the lowest RB (lowest in the frequency domain) of the CORESET to the highest RB (highest in the frequency domain) of the CORESET. That is, $RB_x$ is used as the reference point (e.g., indexed as RB 0) for resource allocation indication in the frequency domain, i.e., $RB_x$ is used as the lowest RB for determining the frequency resource allocation of the group-common PDSCH.

For example, the number of bits of the FDRA indicator in the group-common DCI can be determined according to $\lceil \log_2(N_{RB}^{DL,BWP} (N_{RB}^{DL,BWP}+1)/2) \rceil$, where $N_{RB}^{DL,BWP}$ is set to $RB_y - RB_x + 1$.

In some embodiments, resource allocation type 0 is applied for downlink transmissions. In these embodiments, the resource block assignment information indicated by the FDRA indicator may include a bitmap indicating the resource block groups (RBGs) that are allocated to the scheduled UEs. An RBG may be a set of consecutive RBs (e.g., VRBs) defined based on, for example, the above Table 1, where the bandwidth part size is set to $RB_y - RB_x + 1$. For example, according to the above Table 1, when $RB_y - RB_x + 1$ is 20 (i.e., between "1-36"), the number of VRBs in a RBG is 2 in the case of configuration 1 and is 4 in the case of configuration 2. An RRC signaling may indicate whether configuration 1 or configuration 2 is employed. The number of bits of the bitmap is equal to the total number of RBGs ($N_{RBG}$) for the frequency region, which can be determined by $N_{RBG} = \lceil (RB_y - RB_x + 1)/P \rceil$.

In some embodiments, resource allocation type 1 is applied for downlink transmissions. In these embodiments, the resource block assignment information may indicate an RIV corresponding to a starting RB and a length in terms of contiguously allocated resource blocks. The starting RB of the scheduled PDSCH is in reference to the lowest RB (hereinafter, "$RB_x$") of the CORESET, and the length does not exceed $RB_y - RB_x + 1$. In other words, $RB_x$ may be indexed as RB 0 for PDSCH resource block assignment i.e., $RB_x$ is used as the lowest RB for determining the frequency resource allocation of the group-common PDSCH.

Figure 3:
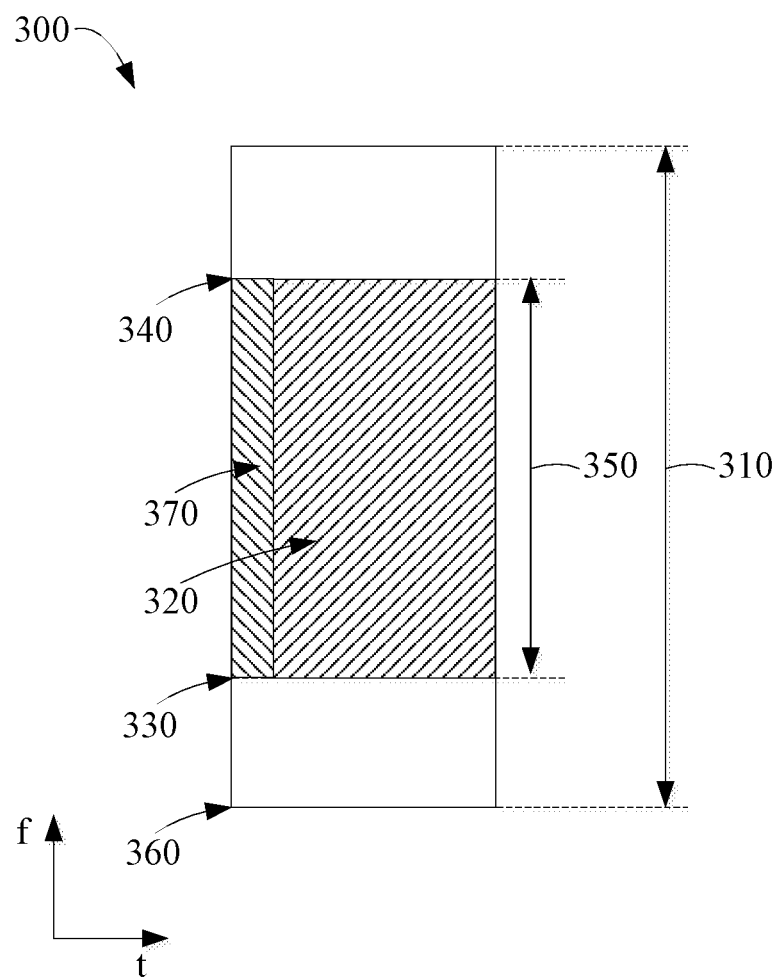
FIG. 3 illustrates exemplary radio resource allocation in accordance with some embodiments of the present disclosure.

FIG. 3 illustrates exemplary radio resource allocation 300 in accordance with some embodiments of the present disclosure. Details described in all of the foregoing embodiments of the present disclosure are applicable for the embodiments shown in FIG. 3. It should be understood that FIG. 3 is only for illustrative purposes, and should not be construed as limiting the embodiments of the present disclosure.

Referring to FIG. 3, a UE (UE #1) may support an active BWP 310. The UE may be a member UE of a group of UEs. Other UEs in the group of UEs support the same or different active BWPs (not shown in FIG. 3).

ABS may configure a common CORESET 370 to the group of UEs via an RRC signaling message. The common CORESET 370 may be within active BWP 310 of UE #1, as well as active BWPs of other UEs of the group of UEs. The common CORESET 370 may start from the lowest RB 330 and may end at the highest RB 340 in the frequency domain.

Although in FIG. 3 the common CORESET 370 seems to occupy a number of contiguous RBs in the frequency domain, it should be appreciated by persons skilled in the art that the common CORESET may include a number of discrete RBs in the frequency domain.

The BS may transmit a DCI format (e.g., a group-common DCI format) to the group of UEs in the common CORESET 370. The BS may transmit the PDSCH scheduled by the DCI format to the group of UEs in frequency region 320, ranging from the lowest RB 330 to the highest RB 340 of the CORESET 370.

The DCI format may include a FDRA indicator indicating the resource block assignment information for the scheduled PDSCH (e.g., a plurality of RBs for carrying the scheduled PDSCH in the frequency region). The number of bits of the FDRA indicator may be determined based on the number of contiguous RBs 350 (e.g., $RB_y - RB_x + 1$). The resource block assignment information may be determined in reference to the lowest RB 330 of the CORESET 370. For example, in the case that the resource block assignment information indicates that RB n is for the scheduled PDSCH, the UE would know that the scheduled PDSCH is transmitted at a frequency resource n RBs higher than the lowest RB 330 in the frequency domain. That is, the lowest RB 330 is indexed as RB 0 when determining the frequency resource for the scheduled PDSCH.

In the case that resource allocation type 0 is applied, the resource block assignment information may include a bitmap indicating the RBGs that are allocated to the scheduled UEs. The number of bits of the bitmap can be determined based on the number of contiguous RBs 350 (e.g., $RB_y - RB_x + 1$), as described above.

In the case that resource allocation type 1 is applied, the resource block assignment information may indicate an RIV corresponding to a starting RB (in reference to the lowest RB 330) and a length in terms of contiguously allocated resource blocks. The length does not exceed the number of contiguous RBs 350.

In this way, the member UEs can receive the scheduled PDSCH on a plurality of RBs within the frequency region 320 based on the DCI format.

In some embodiments of the present disclosure, the CORESET configured by RRC signaling (e.g., MIB, SIB signaling or UE-specific RRC signaling) for a group of UEs to monitor the group-common DCI scheduling a PDSCH may be within the initial DL BWP, rather than the active BWP. For example, the initial DL BWP may be configured to cover the CORESET where the group-common DCI is transmitted.

The PDCCH carrying a group-common DCI may be transmitted in the CORESET. For example, the PDCCH may be transmitted in several REGs within the CORESET. Each REG may represent, for example, one RB in the frequency domain and one OFDM symbol in the time domain.

In some embodiments of the present disclosure, the lowest REG(s) (lowest in the frequency domain) of the PDCCH and the bandwidth of the initial DL BWP of a UE may define a frequency region for transmitting or receiving the scheduled PDSCH. The number of bits of the FDRA indicator in the group-common DCI may be determined based on the number of RBs within the initial DL BWP of the UE. For the group-common PDSCH scheduled by the PDCCH carrying the group-common DCI, RB numbering may start from the RB corresponding to the lowest REG(s) (lowest in the frequency domain) of the PDCCH. That is, the RB associated with the lowest REG of the PDCCH is used as reference RB 0 (e.g., indexed as RB 0) for determining resource allocation indication in the frequency domain.

For example, the number of bits of the FDRA indicator in the group-common DCI can be determined according to $\lceil \log_2(N_{RB}^{DL,BWP}(N_{RB}^{DL,BWP}+1)/2) \rceil$, where $N_{RB}^{DL,BWP}$ is set to the number of RBs within the initial DL BWP of a UE.

In some embodiments, resource allocation type 0 is applied for downlink transmissions. In these embodiments, the resource block assignment information indicated by the FDRA indicator may include a bitmap indicating the RBGs that are allocated to the scheduled UEs. An RBG may be a set of consecutive RBs (e.g., VRBs) defined based on, for example, the above Table 1, where the bandwidth part size is set to the number of RBs within the initial DL BWP of a UE. The number of bits of this bitmap is equal to the total number of RBGs ($N_{RBG}$) for the frequency region, which can be determined by $N_{RBG} = \lceil N_{RB}^{DL,BWP}/P \rceil$ and $N_{RB}^{DL,BWP}$ is set to the number of RBs within the initial DL BWP of a UE.

In some embodiments, resource allocation type 1 is applied for downlink transmissions. In these embodiments, the resource block assignment information may indicate an MV corresponding to a starting RB of the scheduled PDSCH and a length in terms of contiguously allocated resource blocks. The starting RB of the scheduled PDSCH is in reference to the RB associated with the lowest REG of the PDCCH. The length does not exceed the bandwidth of the initial DL BWP of a UE.

Figure 4:
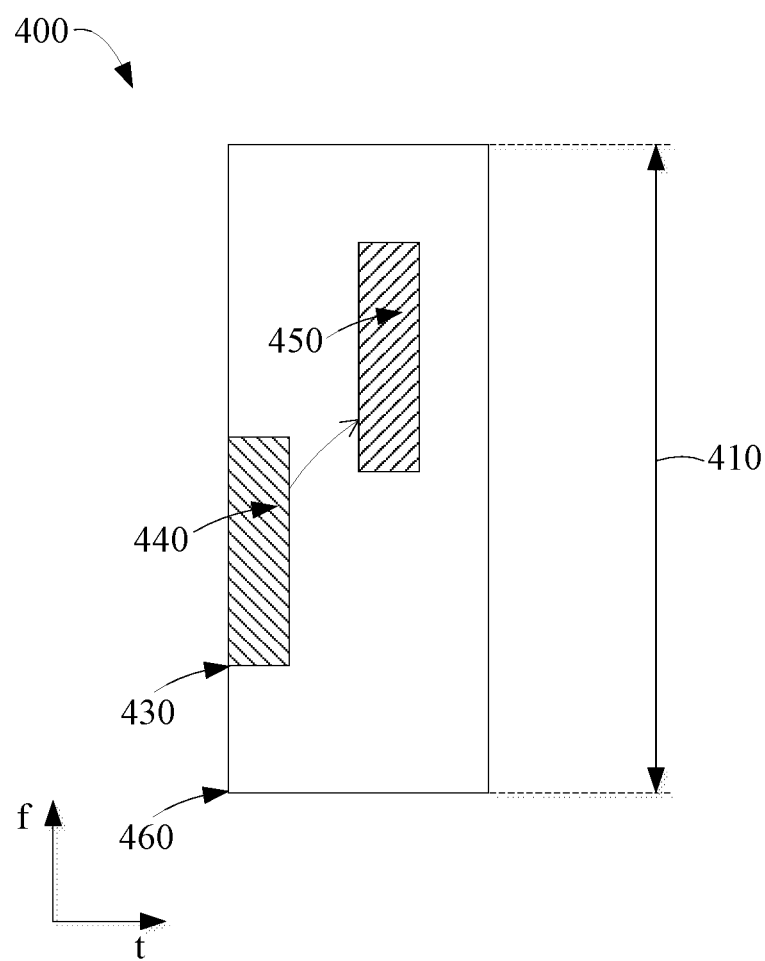
FIG. 4 illustrates exemplary radio resource allocation in accordance with some embodiments of the present disclosure.

FIG. 4 illustrates exemplary radio resource allocation 400 in accordance with some embodiments of the present disclosure. Details described in all of the foregoing embodiments of the present disclosure are applicable for the embodiments shown in FIG. 4. It should be understood that FIG. 4 is only for illustrative purposes, and should not be construed as limiting the embodiments of the present disclosure.

Referring to FIG. 4, a UE (UE #1) may be configured with an initial BWP 410. The UE may be a member UE of a group of UEs. Other UEs in the group of UEs may be configured with the same or different initial BWPs (not shown in FIG. 4).

A BS may configure a CORESET (not shown in FIG. 4) to the group of UEs via an RRC signaling message. The CORESET may be within initial BWP 410 of UE #1, as well as the initial BWPs of other UEs of the group of UEs. The BS may transmit a PDCCH 440 carrying a DCI format to the group of UEs in the configured CORESET. The RB corresponding to the lowest REG (lowest in the frequency domain) of the PDCCH 440 is denoted as RB 430 in FIG. 4. The BS may transmit the PDSCH 450 scheduled by the DCI format to the group of UEs in a frequency region (not shown in FIG. 4) starting from RB 430.

The DCI format may include a FDRA indicator indicating the resource block assignment information for the scheduled PDSCH (e.g., a plurality of RBs for carrying the scheduled PDSCH in the frequency region). The number of bits of the FDRA indicator may be determined based on the number of RBs within the initial BWP (e.g., initial BWP 410).

The resource block assignment information may be determined in reference to RB 430. For example, in the case that the resource block assignment information indicates that RB n is for the scheduled PDSCH, the UE would know that the scheduled PDSCH is transmitted at a frequency resource n RBs higher than RB 430 in the frequency domain. That is, RB 430 is indexed as RB 0 when determining the frequency resource for the scheduled PDSCH.

In the case that resource allocation type 0 is applied, the resource block assignment information may include a bitmap indicating the RBGs that are allocated to the scheduled UEs. The number of bits of the bitmap can be determined based on the number of RBs within the initial BWP (e.g., initial BWP 410).

In the case that resource allocation type 1 is applied, the resource block assignment information may indicate an RIV corresponding to a starting RB (in reference to RB 430) and a length in terms of contiguously allocated resource blocks. The length does not exceed the number of RBs within the initial BWP (e.g., initial BWP 410).

In this way, the member UEs can receive the scheduled PDSCH 450 on a plurality of RBs within the frequency region based on the DCI format.

In some embodiments of the present disclosure, the lowest RB (lowest in the frequency domain) of the initial DL BWP and the bandwidth of the initial DL BWP of a UE may define a frequency region for transmitting or receiving the scheduled PDSCH. The number of bits of the FDRA indicator in the group-common DCI may be determined based on the number of RBs within the initial DL BWP of the UE. For the group-common PDSCH scheduled by the PDCCH carrying the group-common DCI, RB numbering may start from the lowest RB (lowest in the frequency domain) of the initial DL BWP. That is, the lowest RB of the initial DL BWP is used as reference RB 0 (e.g., indexed as RB 0) for resource allocation indication in the frequency domain.

For example, the number of bits of the FDRA indicator in the group-common DCI can be determined according to $\lceil \log_2(N_{RB}^{DL,BWP}(N_{RB}^{DL,BWP}+1)/2) \rceil$, where $N_{RB}^{DL,BWP}$ is set to the number of RBs within the initial DL BWP of a UE.

In some embodiments, resource allocation type 0 is applied for downlink transmissions. In these embodiments, the resource block assignment information indicated by the FDRA indicator may include a bitmap indicating the RBGs that are allocated to the scheduled UEs. An RBG may be a set of consecutive RBs (e.g., VRBs) defined based on, for example, the above Table 1, where the bandwidth part size is set to the number of RBs within the initial DL BWP of a UE. The number of bits of the bitmap is equal to the total number of RBGs ($N_{RBG}$) for the frequency region, which is given by $N_{RBG}=\lceil N_{RB}^{DL,BWP}/P \rceil$ and $N_{RB}^{DL,BWP}$ is set to the number of RBs within the initial DL BWP.

For downlink resource allocation type 1, the resource block assignment information indicates an RIV corresponding to a starting RB of the scheduled PDSCH and a length in terms of contiguously allocated resource blocks. The starting RB of the scheduled PDSCH is in reference to the lowest RB of the initial DL BWP. The length does not exceed the bandwidth of the initial DL BWP of a UE.

For example, still referring to FIG. 4, UE #1 may receive an RRC signaling message from a BS configuring a CORESET (not shown in FIG. 4) for monitoring a PDCCH carrying a DCI format. The CORESET may be within initial BWP 410 of UE #1, as well as initial BWPs of other UEs of the group of UEs. The lowest RB of the initial BWP 410 is denoted as RB 460 in FIG. 4. The BS may transmit the PDSCH 450 scheduled by the DCI format to the group of UEs in a frequency region within the initial BWPs of the group of UEs.

The DCI format may include a FDRA indicator indicating the resource block assignment information for the scheduled PDSCH 450 (e.g., a plurality of RBs for carrying the scheduled PDSCH in the frequency region). The number of bits of the FDRA indicator may be determined based on the number of RBs within the initial BWP (e.g., initial BWP 410).

The resource block assignment information may be determined in reference to RB 460. For example, in the case that the resource block assignment information indicates that RB n is for the scheduled PDSCH, the UE would know that the scheduled PDSCH is transmitted at a frequency resource n RBs higher than RB 460 in the frequency domain. That is, RB 460 is indexed as RB 0 when determining the frequency resource for the scheduled PDSCH.

In the case that resource allocation type 0 is applied, the resource block assignment information may include a bitmap indicating the RBGs that are allocated to the scheduled UEs. The number of bits of the bitmap can be determined based on the number of RBs within the initial BWP (e.g., initial BWP 410).

In the case that resource allocation type 1 is applied, the resource block assignment information may indicate an RIV corresponding to a starting RB (in reference to RB 460) and a length in terms of contiguously allocated resource blocks. The length does not exceed the number of RBs within the initial BWP (e.g., initial BWP 410).

In this way, the member UEs can receive the scheduled PDSCH 450 on a plurality of RBs within the frequency region based on the DCI format.

In some embodiments of the present disclosure, since a UE in an RRC_IDLE state or an RRC_INACTIVE state (hereinafter, "idle UE" or "inactive UE") cannot be configured by UE-specific RRC signaling, the group-common DCI has to be transmitted in CORESET 0, and the scheduled group-common PDSCH has to be transmitted within the frequency region ranging from the lowest RB (hereinafter, "$RB_{x0}$") of the CORESET 0 to the highest RB (hereinafter, "$RB_{y0}$") of the CORESET 0.

The number of bits of a FDRA indicator in the group-common DCI may be determined based on the number of contiguous RBs in the frequency region ranging from the lowest RB of the CORESET 0 to the highest RB of the CORESET For the group-common PDSCH scheduled by the group-common DCI, the RB numbering may start from the lowest RB (lowest in the frequency domain) of CORESET 0 to the highest RB (highest in the frequency domain) of CORESET 0. That is, $RB_{x0}$ is used as the reference point (e.g., indexed as RB 0) for resource allocation indication in the frequency domain i.e., $RB_{x0}$ is used as the lowest RB for determining the frequency resource allocation of the group-common PDSCH.

For example, the number of bits of the FDRA indicator in the group-common DCI can be determined according to $\lceil \log_2(N_{RB}^{DL,BWP}(N_{RB}^{DL,BWP}+1)/2) \rceil$, where $N_{RB}^{DL,BWP}$ is set to $RB_{y0}-RB_{x0}+1$.

In some embodiments, resource allocation type 0 is applied for downlink transmissions. In these embodiments, the resource block assignment information indicated by the FDRA indicator may include a bitmap indicating the RBGs that are allocated to the scheduled UEs. An RBG may be a set of consecutive RBs (e.g., VRBs) defined based on, for example, the above Table 1, where the bandwidth part size is set to $RB_{y0}-RB_{x0}+1$. The number of bits of the bitmap is equal to the total number of RBGs ($N_{RBG}$) for the frequency region, which can be determined by $N_{RBG}=\lceil(RB_{y0}-RB_{x0}+1)/P\rceil$.

In some embodiments, resource allocation type 1 is applied for downlink transmissions. In these embodiments, the resource block assignment information may indicate an RIV corresponding to a starting RB and a length in terms of contiguously allocated resource blocks. The starting RB of the scheduled PDSCH is in reference to the lowest RB of CORESET 0, and the length does not exceed $RB_{y0}-RB_{x0}+1$. In other words, $RB_{x0}$ may be indexed as RB 0 for PDSCH resource block assignment.

The idle UE or inactive UE can receive the group-common DCI in CORESET 0 and the group-common PDSCH in the frequency region defined by the lowest RB and highest RB of CORESET 0.

Figure 5:
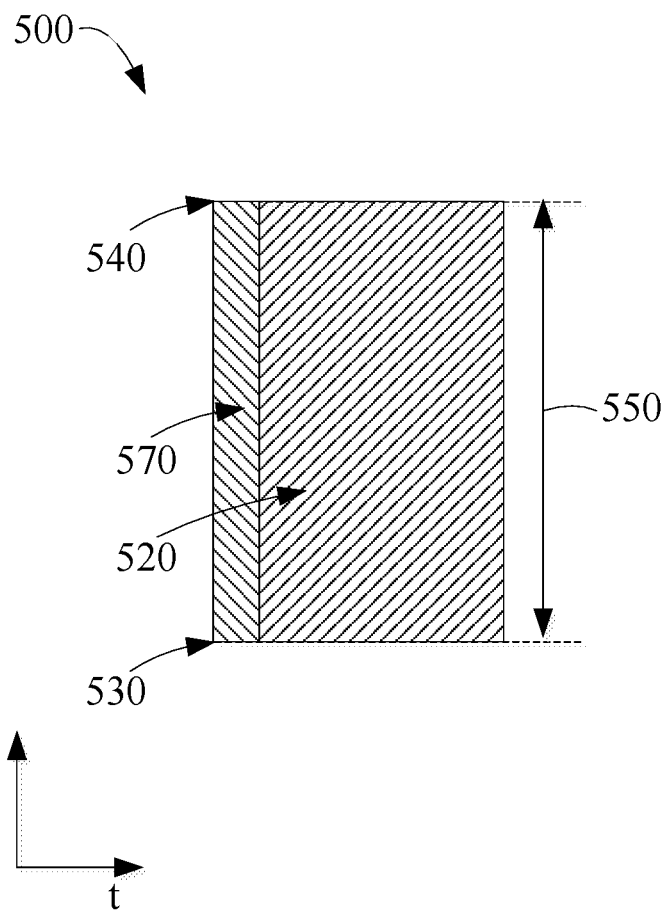
FIG. 5 illustrates exemplary radio resource allocation in accordance with some embodiments of the present disclosure.

FIG. 5 illustrates exemplary radio resource allocation 500 in accordance with some embodiments of the present disclosure. Details described in all of the foregoing embodiments of the present disclosure are applicable for the embodiments shown in FIG. 5. It should be understood that FIG. 5 is only for illustrative purposes, and should not be construed as limiting the embodiments of the present disclosure.

Referring to FIG. 5, a UE (UE #1) may be in an RRC_IDLE state or an RRC_INACTIVE state. UE #1 may be a member UE of a group of UEs. Other UEs in the group of UEs may be an RRC_IDLE state, an RRC_INACTIVE state, or an RRC_CONNECTED state.

A BS may transmit a DCI format (e.g., a group-common DCI format) to the group of UEs in CORESET 0 (e.g., CORESET 570). The BS may transmit the PDSCH scheduled by the DCI format to the group of UEs in frequency region 520, ranging from the lowest RB 530 of the CORESET 570 to the highest RB 540 of the CORESET 570. Although in FIG. 5 the common CORESET 570 seems to occupy a number of contiguous RBs in the frequency domain, it should be appreciated by persons skilled in the art that the common CORESET may include a number of discrete RBs in the frequency domain.

The DCI format may include a FDRA indicator indicating the resource block assignment information for the scheduled PDSCH (e.g., a plurality of RBs for carrying the scheduled PDSCH in the frequency region). The number of bits of the FDRA indicator may be determined based on the number of contiguous RBs 550 (e.g., $RB_{y0}-RB_{x0}+1$). The resource block assignment information may be determined in reference to the lowest RB 530 of the CORESET 570. For example, in the case that the resource block assignment information indicates that RB n is for the scheduled PDSCH, the UE would know that the scheduled PDSCH is transmitted at a frequency resource n RBs higher than the lowest RB 530 in the frequency domain. That is, the lowest RB 530 is indexed as RB 0 when determining the frequency resource for the scheduled PDSCH.

In the case that resource allocation type 0 is applied, the resource block assignment information may include a bitmap indicating the RBGs that are allocated to the scheduled UEs. The number of bits of the bitmap can be determined based on the number of contiguous RBs 550 (e.g., $RB_{y0}-RB_{x0}+1$).

In the case that resource allocation type 1 is applied, the resource block assignment information may indicate an RIV corresponding to a starting RB (in reference to the lowest RB 530) and a length in terms of contiguously allocated resource blocks. The length does not exceed the number of contiguous RBs 550.

In this way, an idle UE or inactive UE can receive the group-common DCI in CORESET 0 and the group-common PDSCH in the frequency region defined by the lowest RB and highest RB of CORESET 0.

In some embodiments of the present disclosure, in the case that a MBS is transmitted to a group of UEs including both connected UEs and idle or inactive UEs, the group-common DCI has to be transmitted in CORESET 0 and the scheduled group-common PDSCH has to be transmitted within the frequency region starting from the lowest RB of the CORESET 0 and ending at the highest RB of the CORESET 0. In this scenario, both connected mode UEs and idle/inactive mode UEs in the group of UEs may receive the group-common DCI in CORESET 0 and the group-common PDSCH in the frequency region defined by the lowest RB and highest RB of CORESET 0.

Figure 6:
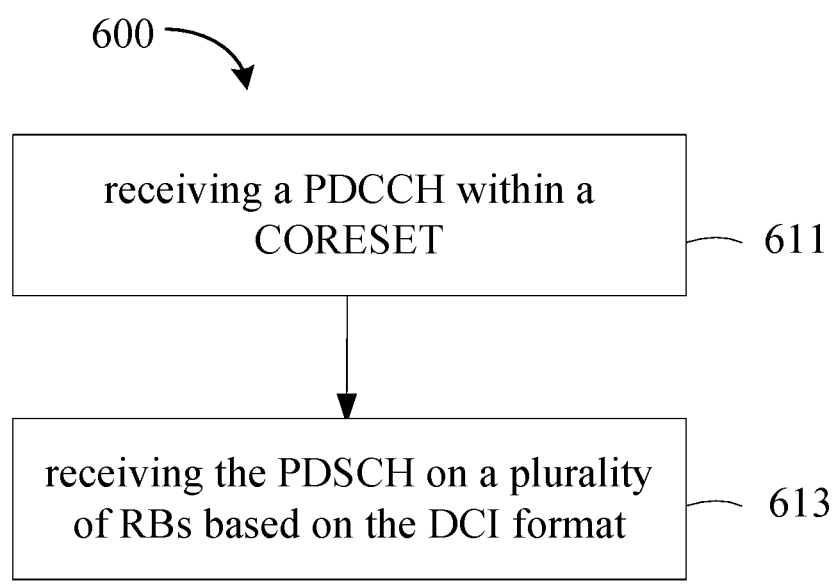
FIG. 6 illustrates a flow chart of an exemplary procedure of wireless communications in accordance with some embodiments of the present disclosure.

FIG. 6 illustrates a flow chart of an exemplary procedure 600 for wireless communications in accordance with some embodiments of the present disclosure. Details described in all of the foregoing embodiments of the present disclosure are applicable for the embodiments shown in FIG. 6. In some examples, the procedure may be performed by a UE, for example, UE 101 in FIG. 1.

Referring to FIG. 6, in operation 611, a UE may receive a PDCCH within a CORESET. The PDCCH may carry a DCI format for scheduling a PDSCH. In some examples, the DCI format may be a group-common DCI format. In operation 613, the UE may receive the PDSCH on a plurality of RBs based on the DCI format. The plurality of RBs may be within a frequency region.

In some embodiments of the present disclosure, the UE may receive an RRC signaling message configuring the frequency region. The frequency region may be shared between the UE and another UE. For example, a group of UEs may be configured with a common frequency region. In some examples, the RRC signaling message may indicate a starting RB (e.g., starting RB 230 in FIG. 2) and a number of contiguous RBs (e.g., the number of contiguous RBs 260 in FIG. 2) of the frequency region. In some other examples, the RRC signaling message may indicate a starting RB and an ending RB (e.g., the ending RB 240 in FIG. 2) of the frequency region. The CORESET may be within the frequency region.

In some embodiments, the plurality of RBs may be determined in reference to the starting RB of the frequency region. For example, the DCI format may indicate resource block assignment information in reference to the starting RB of the frequency region. In some cases, when resource allocation type 0 is applied, the resource block assignment information may include a bitmap indicating the RBGs that are allocated to the UE for receiving the scheduled PDSCH. In some cases, when resource allocation type 1 is applied, the resource block assignment information may indicate an RIV corresponding to a starting RB of the scheduled PDSCH and a length in terms of contiguously allocated resource blocks. The starting RB of the scheduled PDSCH is in reference to the starting RB of the frequency region. The length may not exceed the total number of RBs contained within the frequency region.

In some embodiments, a payload size of the DCI format may be based on the total number of RBs contained within the frequency region. For example, the number of bits of a FDRA indicator in the DCI may be determined based on the total number of RBs in the frequency region.

In some embodiments of the present disclosure, the UE may receive an RRC signaling message configuring the CORESET. The CORESET may be shared between the UE and another UE. In some embodiments, the frequency region may be based on the CORESET.

In some examples, the CORESET (e.g., CORESET 370 in FIG. 3) may be within an active BWP (e.g., active BWP 310 in FIG. 3) of the UE and an active BWP of the another UE. The frequency region may range from the lowest RB (e.g., the lowest RB 330 in FIG. 3) of the CORESET to the highest RB (e.g., the highest RB 340 in FIG. 3) of the CORESET. The plurality of RBs may be determined in reference to the lowest RB of the CORESET. For example, the DCI format may indicate resource block assignment information in reference to the lowest RB of the CORESET.

In some cases, when resource allocation type 0 is applied, the resource block assignment information may include a bitmap indicating the RBGs that are allocated to the UE for receiving the scheduled PDSCH. In some cases, when resource allocation type 1 is applied, the resource block assignment information may indicate an MV corresponding to a starting RB of the scheduled PDSCH and a length in terms of contiguously allocated resource blocks. The starting RB of the scheduled PDSCH is in reference to the lowest RB of the CORESET. The length may not exceed the total number of contiguous RBs from the lowest RB of the CORESET to the highest RB of the CORESET.

In some embodiments, a payload size of the DCI format may be based on the total number of contiguous RBs from the lowest RB of the CORESET to the highest RB of the CORESET. For example, the number of bits of a FDRA indicator in the DCI may be determined based on the total number of contiguous RBs from the lowest RB of the CORESET to the highest RB of the CORESET.

In some other examples, the CORESET in which the PDCCH is transmitted may be within an initial DL BWP (e.g., initial BWP 410 in FIG. 4) of the UE and an initial DL BWP of the another UE. The frequency region may start from the RB (e.g., RB 430 in FIG. 4) corresponding to the lowest REG of the PDCCH. The plurality of RBs may be determined in reference to the RB corresponding to the lowest REG of the PDCCH. For example, the DCI format may indicate resource block assignment information in reference to the RB corresponding to the lowest REG of the PDCCH.

In some cases, when resource allocation type 0 is applied, the resource block assignment information may include a bitmap indicating the RBGs that are allocated to the UE for receiving the scheduled PDSCH. In some cases, when resource allocation type 1 is applied, the resource block assignment information may indicate an MV corresponding to a starting RB of the scheduled PDSCH and a length in terms of contiguously allocated resource blocks. The starting RB of the scheduled PDSCH is in reference to the RB corresponding to the lowest REG of the PDCCH. The length may not exceed the bandwidth of the initial DL BWP of the UE.

In some embodiments, a payload size of the DCI format may be based on the initial DL BWP of the UE. For example, the number of bits of a FDRA indicator in the DCI may be determined based on the number of RBs within the initial DL BWP of the UE.

In some embodiments of the present disclosure, the CORESET and the frequency region may be within an initial DL BWP (e.g., initial BWP 410 in FIG. 4) of the UE and an initial DL BWP of another UE. The plurality of RBs may be determined in reference to the lowest RB of the initial downlink BWP of the UE.

In some cases, when resource allocation type 0 is applied, the resource block assignment information may include a bitmap indicating the RBGs that are allocated to the UE for receiving the scheduled PDSCH. In some cases, when resource allocation type 1 is applied, the resource block assignment information may indicate an RIV corresponding to a starting RB of the scheduled PDSCH and a length in terms of contiguously allocated resource blocks. The starting RB of the scheduled PDSCH is in reference to the lowest RB of the initial downlink BWP of the UE. The length may not exceed the bandwidth of the initial DL BWP of the UE.

In some embodiments, a payload size of the DCI format may be based on the initial DL BWP of the UE. For example, the number of bits of a FDRA indicator in the DCI may be determined based on the number of RBs within the initial DL BWP of the UE.

In some embodiments of the present disclosure, in the case that the UE is in an idle or inactive state, the CORESET in which the PDCCH in received by the UE is CORESET 0. The PDSCH scheduled by the DCI format is received by the UE within a frequency region ranging from the lowest RB (e.g., "$RB_{x0}$") of the CORESET 0 to the highest RB (e.g., "$RB_{y0}$") of the CORESET 0.

It should be appreciated by persons skilled in the art that the sequence of the operations in exemplary procedure 600 may be changed and some of the operations in exemplary procedure 600 may be eliminated or modified, without departing from the spirit and scope of the disclosure.

Figure 7:
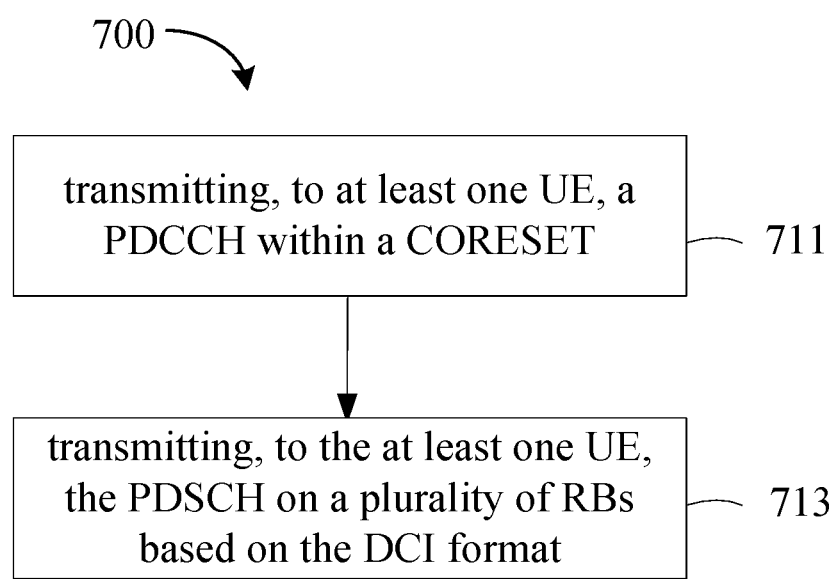
FIG. 7 illustrates a flow chart of an exemplary procedure of wireless communications in accordance with some embodiments of the present disclosure.

FIG. 7 illustrates a flow chart of an exemplary procedure 700 for wireless communications in accordance with some embodiments of the present disclosure. Details described in all of the foregoing embodiments of the present disclosure are applicable for the embodiments shown in FIG. 7. In some examples, the procedure may be performed by a BS, for example, BS 102 in FIG. 1.

Referring to FIG. 7, in operation 711, a BS may transmit, to at least one UE, a PDCCH within a CORESET. The PDCCH may carry a DCI format for scheduling a PDSCH. In operation 713, the BS may transmit, to the at least one UE, the PDSCH on a plurality of RBs based on the DCI format. The plurality of RBs may be within a frequency region.

In some embodiments of the present disclosure, the BS may transmit an RRC signaling message configuring the frequency region. The frequency region may be shared between the at least one UE. For example, a group of UEs may be configured with a common frequency region. In some examples, the RRC signaling message may indicate a starting RB (e.g., starting RB 230 in FIG. 2) and a number of contiguous RBs (e.g., the number of contiguous RBs 250 in FIG. 2) of the frequency region. In some other examples, the RRC signaling message may indicate a starting RB and an ending RB (e.g., the ending RB 240 in FIG. 2) of the frequency region. The CORESET may be within the frequency region.

In some embodiments, the plurality of RBs may be in reference to the starting RB of the frequency region. For example, the DCI format may indicate resource block assignment information in reference to the starting RB of the frequency region. In some cases, when resource allocation type 0 is applied, the resource block assignment information may include a bitmap indicating the RBGs that are allocated to the UE for receiving the scheduled PDSCH. In some cases, when resource allocation type 1 is applied, the resource block assignment information may indicate an RIV corresponding to a starting RB of the scheduled PDSCH and a length in terms of contiguously allocated resource blocks. The starting RB of the scheduled PDSCH is in reference to the starting RB of the frequency region. The length may not exceed the total number of RBs contained within the frequency region.

In some embodiments, a payload size of the DCI format may be based on the total number of RBs contained within the frequency region. For example, the number of bits of a FDRA indicator in the DCI may be determined based on the total number of RBs in the frequency region.

In some embodiments of the present disclosure, the BS may transmit an RRC signaling message configuring the CORESET. The CORESET may be shared between the at least one UE. In some embodiments, the frequency region may be based on the CORESET.

In some examples, the CORESET (e.g., CORESET 370 in FIG. 3) may be within an active BWP (e.g., active BWP 310 in FIG. 3) of the at least one UE. The frequency region may range from the lowest RB (e.g., the lowest RB 330 in FIG. 3) of the CORESET to the highest RB (e.g., the highest RB 340 in FIG. 3) of the CORESET. The plurality of RBs may be determined in reference to the lowest RB of the CORESET. For example, the DCI format may indicate resource block assignment information in reference to the lowest RB of the CORESET.

In some cases, when resource allocation type 0 is applied, the resource block assignment information may include a bitmap indicating the RBGs that are allocated to the UE for receiving the scheduled PDSCH. In some cases, when resource allocation type 1 is applied, the resource block assignment information may indicate an MV corresponding to a starting RB of the scheduled PDSCH and a length in terms of contiguously allocated resource blocks. The starting RB of the scheduled PDSCH is in reference to the lowest RB of the CORESET. The length may not exceed the total number of contiguous RBs from the lowest RB of the CORESET to the highest RB of the CORESET.

In some embodiments, a payload size of the DCI format may be based on the total number of contiguous RBs from the lowest RB of the CORESET to the highest RB of the CORESET. For example, the number of bits of a FDRA indicator in the DCI may be determined based on the total number of contiguous RBs from the lowest RB of the CORESET to the highest RB of the CORESET.

In some other examples, the CORESET in which the PDCCH is transmitted may be within an initial DL BWP (e.g., initial BWP 410 in FIG. 4) of the at least one UE. The frequency region may start from the RB (e.g., RB 430 in FIG. 4) corresponding to the lowest REG of the PDCCH. The plurality of RBs may be determined in reference to the RB corresponding to the lowest REG of the PDCCH. For example, the DCI format may indicate resource block assignment information in reference to the RB corresponding to the lowest REG of the PDCCH.

In some cases, when resource allocation type 0 is applied, the resource block assignment information may include a bitmap indicating the RBGs that are allocated to the UE for receiving the scheduled PDSCH. In some cases, when resource allocation type 1 is applied, the resource block assignment information may indicate an MV corresponding to a starting RB of the scheduled PDSCH and a length in terms of contiguously allocated resource blocks. The starting RB of the scheduled PDSCH is in reference to the RB corresponding to the lowest REG of the PDCCH. The length may not exceed the bandwidth of the initial DL BWP of the UE.

In some embodiments, a payload size of the DCI format may be based on the initial DL BWP of the UE. For example, the number of bits of a FDRA indicator in the DCI may be determined based on the number of RBs within the initial DL BWP of the UE.

In some embodiments of the present disclosure, the CORESET and the frequency region may be within an initial DL BWP (e.g., initial BWP 410 in FIG. 4) of the at least one UE. The plurality of RBs may be determined in reference to the lowest RB of the initial downlink BWP of the at least one UE.

In some cases, when resource allocation type 0 is applied, the resource block assignment information may include a bitmap indicating the RBGs that are allocated to the UE for receiving the scheduled PDSCH. In some cases, when resource allocation type 1 is applied, the resource block assignment information may indicate an MV corresponding to a starting RB of the scheduled PDSCH and a length in terms of contiguously allocated resource blocks. The starting RB of the scheduled PDSCH is in reference to the lowest RB of the initial downlink BWP of the at least one UE. The length may not exceed the bandwidth of the initial DL BWP of the at least one UE.

In some embodiments, a payload size of the DCI format may be based on the initial DL BWP of the at least one UE. For example, the number of bits of a FDRA indicator in the DCI may be determined based on the number of RBs within the initial DL BWP of the at least one UE.

In some embodiments of the present disclosure, in the case that the at least one UE includes an idle UE or inactive state UE, the CORESET in which the PDCCH in transmitted is CORESET 0. The PDSCH scheduled by the DCI format is transmitted within a frequency region ranging from the lowest RB (e.g., "$RB_{x0}$") of the CORESET 0 to the highest RB (e.g., "$RB_{y0}$") of the CORESET 0.

It should be appreciated by persons skilled in the art that the sequence of the operations in exemplary procedure 700 may be changed and some of the operations in exemplary procedure 700 may be eliminated or modified, without departing from the spirit and scope of the disclosure.

Figure 8:
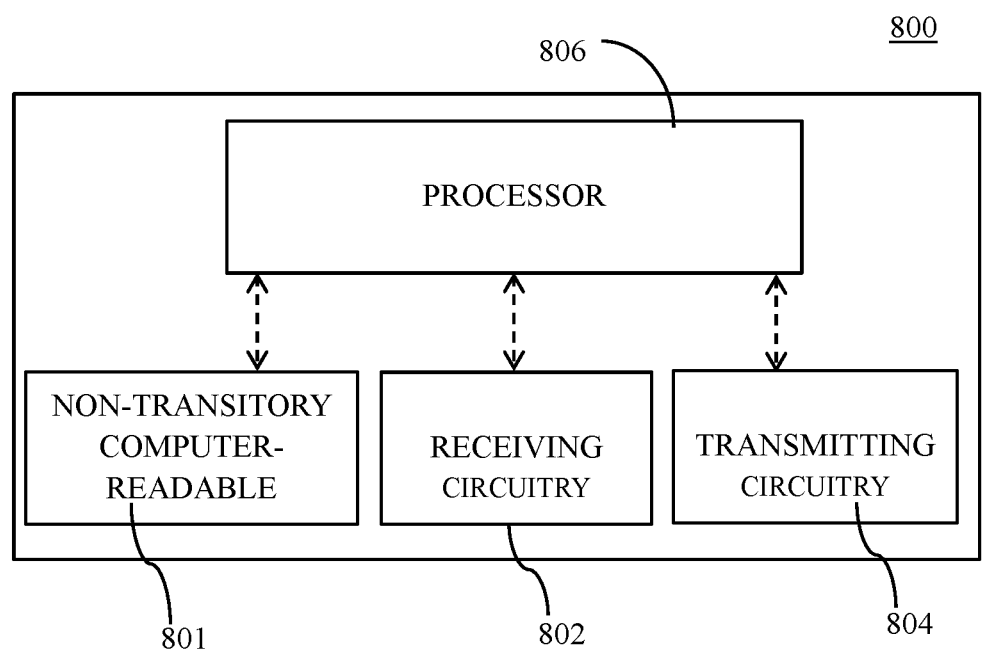
FIG. 8 illustrates a block diagram of an exemplary apparatus in accordance with some embodiments of the present disclosure.

FIG. 8 illustrates a block diagram of an exemplary apparatus 800 according to some embodiments of the present disclosure.

As shown in FIG. 8, the apparatus 800 may include at least one non-transitory computer-readable medium 801, at least one receiving circuitry 802, at least one transmitting circuitry 804, and at least one processor 806 coupled to the non-transitory computer-readable medium 801, the receiving circuitry 802 and the transmitting circuitry 804. The apparatus 800 may be a base station side apparatus (e.g., a BS) or a communication device (e.g., a UE).

Although in this figure, elements such as the at least one processor 806, transmitting circuitry 804, and receiving circuitry 802 are described in the singular, the plural is contemplated unless a limitation to the singular is explicitly stated. In some embodiments of the present application, the receiving circuitry 802 and the transmitting circuitry 804 are combined into a single device, such as a transceiver. In certain embodiments of the present application, the apparatus 800 may further include an input device, a memory, and/or other components.

In some embodiments of the present disclosure, the non-transitory computer-readable medium 801 may have stored thereon computer-executable instructions to cause a processor to implement the method with respect to the UEs as described above. For example, the computer-executable instructions, when executed, cause the processor 806 interacting with receiving circuitry 802 and transmitting circuitry 804, so as to perform the operations with respect to the UEs described in FIGS. 1-7.

In some embodiments of the present disclosure, the non-transitory computer-readable medium 801 may have stored thereon computer-executable instructions to cause a processor to implement the method with respect to the BSs as described above. For example, the computer-executable instructions, when executed, cause the processor 806 interacting with receiving circuitry 802 and transmitting circuitry 804, so as to perform the operations with respect to the BSs described in FIGS. 1-7.

Those having ordinary skill in the art would understand that the operations or steps of a method described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. Additionally, in some aspects, the operations or steps of a method may reside as one or any combination or set of codes and/or instructions on a non-transitory computer-readable medium, which may be incorporated into a computer program product.

While this disclosure has been described with specific embodiments thereof, it is evident that many alternatives, modifications, and variations may be apparent to those skilled in the art. For example, various components of the embodiments may be interchanged, added, or substituted in other embodiments. Also, all of the elements of each figure are not necessary for the operation of the disclosed embodiments. For example, one of ordinary skill in the art of the disclosed embodiments would be enabled to make and use the teachings of the disclosure by simply employing the elements of the independent claims. Accordingly, embodiments of the disclosure as set forth herein are intended to be illustrative, not limiting. Various changes may be made without departing from the spirit and scope of the disclosure.

In this document, the terms "includes," "including," or any other variation thereof, are intended to cover a non-exclusive inclusion, such that a process, method, article, or apparatus that includes a list of elements does not include only those elements but may include other elements not expressly listed or inherent to such process, method, article, or apparatus. An element proceeded by "a," "an," or the like does not, without more constraints, preclude the existence of additional identical elements in the process, method, article, or apparatus that includes the element. Also, the term "another" is defined as at least a second or more. The term "having" and the like, as used herein, are defined as "including." The wording "the first," "the second" or the like is only used to clearly illustrate the embodiments of the present application, but is not used to limit the substance of the present application.

What is claimed:

1. A method for wireless communication performed by a user equipment (UE), comprising:
   receiving a physical downlink control channel (PDCCH) within a control resource set (CORESET), wherein the PDCCH carries a downlink control information (DCI) format for scheduling a physical downlink shared channel (PDSCH); and
   receiving the PDSCH on a plurality of resource blocks (RBs) based on the DCI format, wherein the plurality of RBs are within a frequency region.

2. The method of claim 1, further comprising:
   receiving a radio resource control (RRC) signaling message configuring the frequency region, wherein the frequency region is shared between the UE and another UE.

3. The method of claim 2, wherein:
   the RRC signaling message indicates a starting RB and a number of contiguous RBs of the frequency region; or
   the RRC signaling message indicates a starting RB and an ending RB of the frequency region.

4. The method of claim 3, wherein the plurality of RBs is determined in reference to the starting RB of the frequency region.

5. The method of claim 2, wherein the CORESET is within the frequency region.

6. The method of claim 2, wherein a payload size of the DCI format is based on a total number of RBs contained within the frequency region.

7. The method of claim 1, further comprising:
   receiving a radio resource control (RRC) signaling message configuring the CORESET, wherein the CORESET is shared between the UE and another UE.

8. The method of claim 7, wherein the frequency region is based on the CORESET.

9. The method of claim 8, wherein the CORESET is within an active bandwidth part (BWP) of the UE and an active BWP of the another UE, and the plurality of RBs is determined in reference to the lowest RB of the CORESET.

10. The method of claim 8, wherein the CORESET is within an initial downlink bandwidth part (BWP) of the UE and an initial downlink BWP of the another UE, and the plurality of RBs is determined in reference to the RB corresponding to the lowest resource element group (REG) of the PDCCH.

11. The method of claim 10, wherein a payload size of the DCI format is based on the initial downlink BWP of the UE.

12. The method of claim 7, wherein a payload size of the DCI format is based on a total number of contiguous RBs from the lowest RB of the CORESET to the highest RB of the CORESET.

13. The method of claim 1, wherein the CORESET and the frequency region are within an initial downlink bandwidth part (BWP) of the UE and an initial downlink BWP of another UE.

14. The method of claim 13, wherein the plurality of RBs is determined in reference to the lowest RB of the initial downlink BWP of the UE.

15. An apparatus, comprising:
   at least one non-transitory computer-readable medium having stored thereon computer-executable instructions;
   at least one receiving circuitry;
   at least one transmitting circuitry; and
   at least one processor coupled to the at least one non-transitory computer-readable medium, the at least one receiving circuitry and the at least one transmitting circuitry,
   wherein the computer-executable instructions cause the at least one processor to implement a method, the method comprising:
   receiving a physical downlink control channel (PDCCH) within a control resource set (CORESET), wherein the PDCCH carries a downlink control information (DCI) format for scheduling a physical downlink shared channel (PDSCH); and
   receiving the PDSCH on a plurality of resource blocks (RBs) based on the DCI format, wherein the plurality of RBs are within a frequency region.

16. The apparatus of claim 15, further comprising:
   receiving a radio resource control (RRC) signaling message configuring the frequency region, wherein the frequency region is shared between the UE and another UE.

17. The apparatus of claim 16, wherein:
   the RRC signaling message indicates a starting RB and a number of contiguous RBs of the frequency region; or
   the RRC signaling message indicates a starting RB and an ending RB of the frequency region.

18. The apparatus of claim 16, wherein the CORESET is within the frequency region.

19. The apparatus of claim 15, further comprising:
   receiving a radio resource control (RRC) signaling message configuring the CORESET, wherein the CORESET is shared between the UE and another UE.

20. The apparatus of claim 15, wherein the CORESET and the frequency region are within an initial downlink bandwidth part (BWP) of the UE and an initial downlink BWP of another UE.

* * * * *